UNITED STATES PATENT OFFICE.

JULIUS BRÖNNER AND HERMANN GUTZKOW, OF FRANKFORT-ON-THE MAIN, PRUSSIA.

IMPROVED PROCESS OF TREATING ASPHALTUM TO OBTAIN COLORS AND DYES.

Specification forming part of Letters Patent No. 97,597, dated December 7, 1869.

*To all whom it may concern:*

Be it known that we, JULIUS BRÖNNER and HERMANN GUTZKOW, both of Frankfort-on-the-Main, in the Kingdom of Prussia, have invented an improved method of obtaining anthracene out of *asphaltos*—that is to say, pitch produced from coal-tar—and of preparing two coloring matters from the anthracene; and we do hereby declare that the following is a full and exact description thereof.

In order to obtain anthracene and similar substances out of *asphaltos*, we distill it by the aid of superheated steam in a gas-retort, and lead the vapors by the shortest way through a large pipe into an intermediary barrel or other receptacle, out of which the raw condensed masses of anthracene can be drained off, as required. We lead the still non-condensed gases out of this intermediate receptacle through a large refrigerator, and from thence either into a gas-holder or into the open air; or we make a direct use of them for heating.

Out of the anthracene (sufficiently purified) obtained in this way, and out of the anthracene (sufficiently purified) prepared from the heavy oil of coal-tar, we produce the two coloring matters in the following way:

By means of oxidation or substitution we transform the anthracene into a new product. For this purpose we employ any known means of oxidation or substitution capable of causing this alteration—for example, the bichromate of potassa and sulphuric acid or crystallized acetic acid, but particularly nitric acid, diluted or concentrated.

We purify this new product either by crystallization, sublimation, or in any other way; and by oxidation of the said product, and, if necessary to the complete development of the two coloring matters, by further treatment with alkalies, we prepare the two coloring matters. We also prepare them directly from the unpurified product. For this purpose we dissolve it, preferably, in sulphuric acid, and for the oxidation we take any substance giving oxygen—such, for example, as nitric acid and the nitrates, sulphates, oxides, and protoxides of metals, and their combinations with acids, (combinations that are capable of being reduced,) arsenic acid, chromic acid, or other acids giving oxygen, or the chlorides of metals.

We usually operate in the following way: We mix anthracene, at an ordinary or at an elevated temperature, with double its weight of nitric acid of 1.5° to 1.3° specific gravity, wash the new product with water, and dissolve it purified (or not purified) in the requisite quantity of sulphuric acid. For the better dissolution of this product we heat it, and then add the necessary quantity of a salt of mercury—protonitrate of mercury or deutonitrate of mercury, for instance—and effect the process by heating or otherwise.

When the coloring matters are formed, we treat them, if necessary to the complete development of the two coloring matters, by alkalies. We then dissolve the coloring matters in a suitable manner, either by cold or boiling water, by alcohol, ether, sulphuret of carbon, by dissolved alums, by dissolved alkalies, or by other means. We then evaporate the liquids or precipitate by acids, and finally purify the two coloring matters by crystallization, or by sublimation, or by any other means.

According to the oxidizing substances which we have elected to use, to the quantity we have used, or according to the degree of temperature we have produced, we obtain a coloring matter which can be dissolved in alcohol, ether, or analogous substance with a yellow color, and another one which is to be dissolved in like manner with a red color.

Being also able to dissolve in alkalies the product of the anthracene obtained by nitric acid, or by bichromate of potassa and sulphuric acid, or by crystallized acetic acid, or by substances acting in a similar manner, and being able to obtain the two coloring matters also in a corresponding way by oxides and protoxides by metallic salts—such as, for example, deutosulphate of copper or another copper combination, or by chlorides of metals, or by any oxidizing matter acting on the alkaline solution of our first product—we attach no particular value to the dissolving in sulphuric acid, or to the oxidation by protonitrate of mercury or deutonitrate of mercury.

Our process differs from that known as Messrs. Graebe and Liebermann's, first, inasmuch that we oxidize the first product we obtain from the anthracene, whereas they substitute hydrogen by brom, and then, in order to remove the brom, introduce twice H O by alkalies; and, secondly, inasmuch that we not only obtain alizarine, but also another coloring matter, which is to be dissolved in alcohol and analogous matters similar to purpurine with red color, and not like alizarine with a yellow one.

What we claim as our invention, and desire to secure by Letters Patent, is—

1. The preparation of anthracene and similar substances out of *asphaltos*—that is to say, pitch obtained from coal-tar in the manner herein set forth, and the oxidizing of the product which we obtain out of the anthracene by means of nitric acid, or the other substances hereinbefore recited, using in the said oxidation the substances above mentioned, or other substances acting in a similar manner, and in the further treatment with alkalies, if necessary to the complete development of the two coloring matters.

2. Changing anthracene into both coloring matters in one operation by uniting or combining the two described processes, the whole substantially as herein set forth.

JULIUS BRÖNNER.
HERMANN GUTZKOW.

Witnesses:
  V. PEEFALL,
    *Sandstrasse, No. 6,*
      *in Frankfort on-the-Main.*
  GEORG SARTORI,
    *Bockenheimer Sandstrasse, No. 175,*
      *in Frankfort-on-the-Main.*